3,500,059
Patented Mar. 10, 1970

3,500,059
RAIN DETECTING DEVICE
Eric Fielding, Cosham, Jerome O'Hea, Chichester, and Brian M. Cole, Emsworth, England, assignors to Colt Ventilation and Heating Limited, Surbiton, Surrey, England, a British company
Filed Apr. 14, 1967, Ser. No. 630,903
Int. Cl. H01h 35/42
U.S. Cl. 307—118                    10 Claims

ABSTRACT OF THE DISCLOSURE

Rain sensor comprising an electrically insulating sheet having interdigitated conducting foil electrodes formed on one surface which are connected together by raindrops impinging on the surface. The opposite surface has a heating element on it which may also be formed as a conducting foil and which provides uniform heating over the whole area of the sensor sheet so that the rain is rapidly evaporated. The sensor sheet may form the lid of a box containing associated circuitry, thermostat for the heater etc.

PRIOR APPLICATIONS

Figure 1:
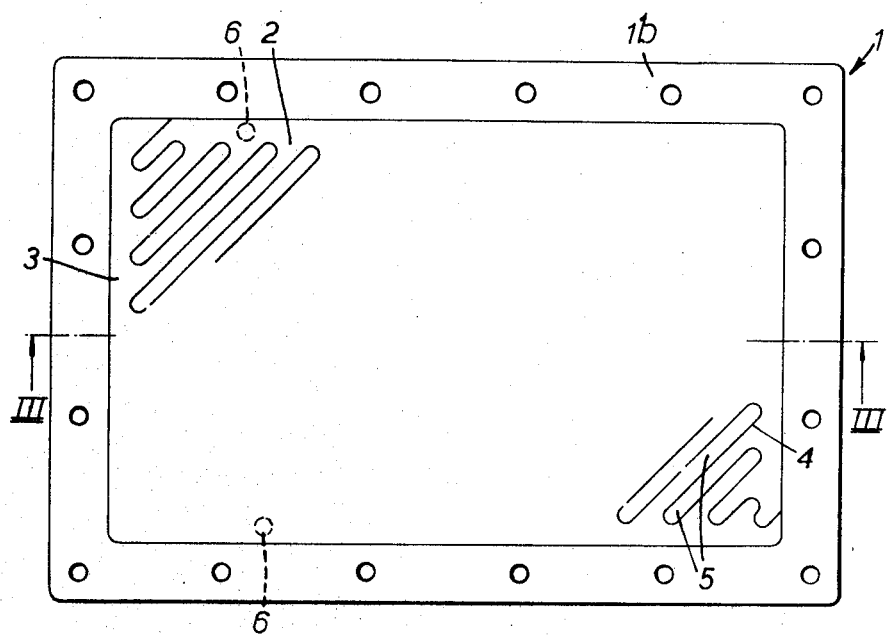

Great Britain, Apr. 22, 1965, application No. 17083/65.
Australia, Apr. 20, 1966, application No. 4492/66.
Belgium, Apr. 22, 1966, application No. 27157.
Holland, Apr. 21, 1966, application No. 6605343.
South Africa, Apr. 18, 1966, application No. 66/2210.

This invention relates to electrically actuated devices for sensing the presence of atmospheric moisture, and in particular to rain sensors. These devices may be used to actuate mechanisms for opening and closing windows, ventilators and the like where it is desirable that these should close automatically when it rains and should open again automatically after the rain has stopped.

A particular arrangement of known rain sensor comprises an insulating surface covered by conducting foil, the foil being divided into two parts by a narrow channel which passes from one side of the surface to the other in a long and tortuous path. When the weather is dry, the two parts of foil are required to be electrically separated from each other. When it rains, the first raindrop to bridge the channel between the two parts is required to make electrical connection between them, so completing a circuit. Electric current may now pass through this circuit to initiate operation of a mechanism that shuts the windows, ventilators or the like with which the sensor is associated. Once the rain stops, the moisture on the surface of the sensor is required to evaporate quickly, thus breaking electrical connection between the two areas and causing the mechanism to open the windows or the like of the associated apparatus.

According to this invention a device for detecting the presence of atmospheric moisture comprises an electrically-insulating, heat-transmitting, plate-like member impervious to moisture having one surface exposed to the atmosphere, a sensing electric circuit on said exposed surface and responsive to atmospheric moisture thereon and an electric heater in thermal conductive relationship with the other surface of said member.

The use of a plate-like member between the sensing circuit and the electric heater enables said member, circuit and heater to be made as an integral unit for convenient removal and replacement. Such a unit may then conveniently form a removable cover of a box-like structure containing terminal blocks, electrical components and so on. Further, the plate-like member may be relatively large so that the device functions promptly to detect rain falling on a large surface, the sensing circuit extending over substantially the entire surface of the plate-like member. Similarly the heater may extend over substantially the entire surface of the plate-like member to give uniform heating so that evaporation of the moisture (rain) is rapidly performed.

According to a feature of this invention a thin electrical sensing circuit is formed on one surface of the electrically-insulating, plate-like member by plating, printed circuit techniques or the like; the heating circuit may be similarly formed on the other surface of said member.

The sensing circuit may comprise two conducting zones separated by a narrow gap in the form of a continuous tortuous path extending from one side of the surface to the other; the two zones may have the appearance of the heads of two rakes, the prongs of one rake meshing with those of the other. A thermostat may be provided to control the heat generated by the heating circuit.

A convenient sensor unit may take the form of a box, of which a closure lid or top constitutes said plate-like insulating member. The exposed surface referred to above is the outside face of the lid. The box is divided interiorly into two parts by an asbestos or other heat-insulating shield; the lid and said thermostat lie to one side of this shield, and part of the circuitry linking the sensor to the apparatus controlled by it may be mounted in the box to the other side of the shield. The rest of the circuitry, including a transformer to step-down the mains voltage to a value suitable to put across the conducting zones, may be mounted in a control unit separate from the box.

Figure 2:
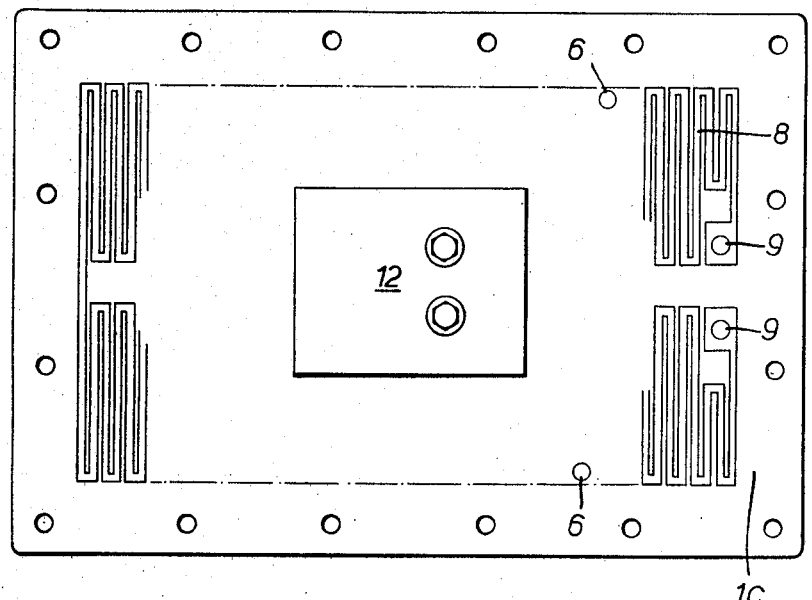
Figure 3:
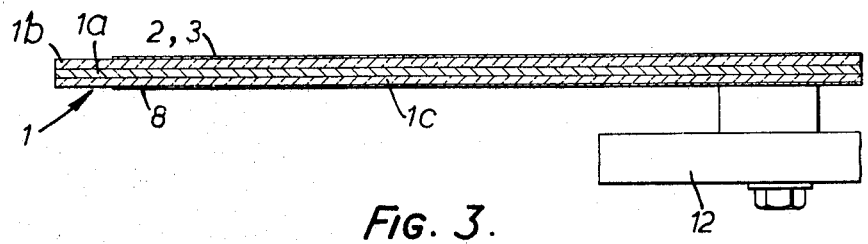
Figure 4:
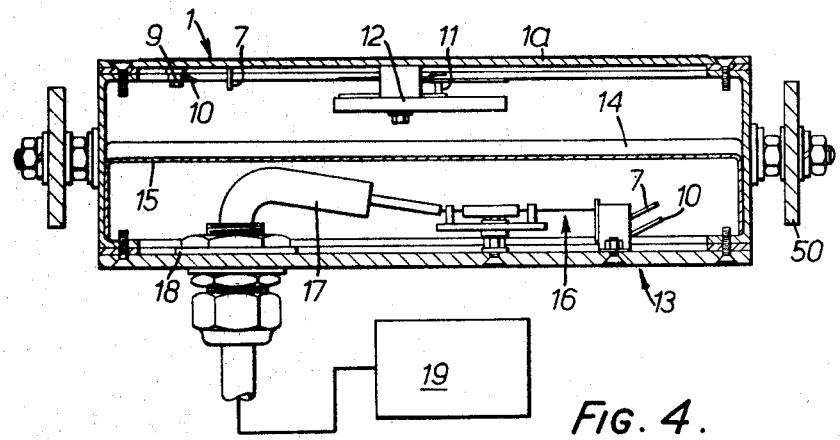
Figure 5:
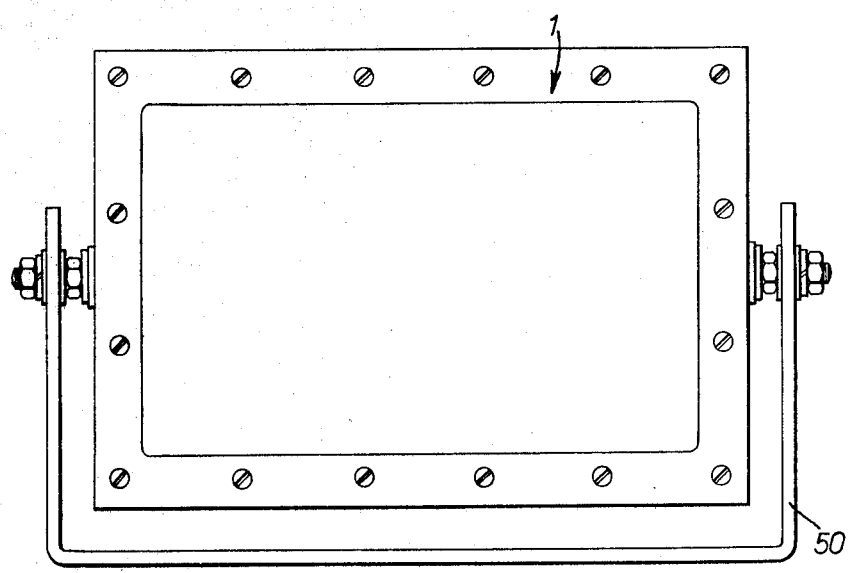

One arrangement of a rain sensor according to this invention will now be described, by way of example, with reference to the accompanying diagrammatic drawings in which:

FIG. 1 is a plan view of the rain sensor;
FIG. 2 is an underneath plan view of the sensor of FIG. 1 showing the heating circuit;
FIG. 3 is a section on the line III—III of FIG. 1;
FIG. 4 is a section through a box of which the sensor constitutes the top;
FIG. 5 is a top plan view of the box of FIG. 4; and
FIG. 6 is a circuit diagram of a rain detector of which the sensor forms part.

The sensor comprises a base 1 including an aluminium panel 1a, with facings 1b, 1c, of epoxy glass. Two conducting zones 2, 3 are printed on the facing 1b. Each zone is about two or three thousandths of an inch thick, and comprises a copper substrate with a top flash of gold. The latter is about 1/10 of a thousandths of an inch thick. The zones 2, 3 are separated by a tortuous path 4, which is about 40 thousandths of an inch wide, and its configuration is such that each zone appears to point a series of parallel fingers 5 towards the other. The fingers are roughly twice as broad as the path and those of one zone mesh with those of the other. Each zone has a terminal 6 for connection to leads 7 (FIG. 3). A sinuous form for zones 2 and 3 is preferred since it enables a large path to be accommodated in a relatively small area and for this reason also it is preferred that the runs of the zones 2 and 3 are disposed diagonally of the panel 1a. A cupro-nickel heating coil 8 is printed on facing 1c, and has terminals 9 for connection to leads 10. In FIG. 3 the thicknesses of the components of the sensor are greatly exaggerated for the sake of clarity. A thermostat 11 is mounted on a rectangular area 12 of cupro-nickel printed upon the centre of the surface 1c; this thermostat controls the quantity of heat generated by the coil 8.

FIG. 4 shows a complete sensor unit comprising a closed box 13 of which the base 1 constitutes the top. This box may be mounted, preferably tiltably in frame 50, on the roof of a factory close to the ventilators or the like which are to be automatically closed whenever it is raining but which are to remain open at other times. The box 13 is spanned by an asbestos, heat-insulating shield 14, and a hole 15 in this shield allows the leads 7, 10, to pass through to electronic equipment mounted in the lower half of the box 13—such equipment being represented diagrammatically by the unit 16 in FIG. 4. The output cable 17 from this unit passes from the box 13 through a gland 18 to a control unit shown diagrammatically at 19 in FIG. 4.

Figure 6:
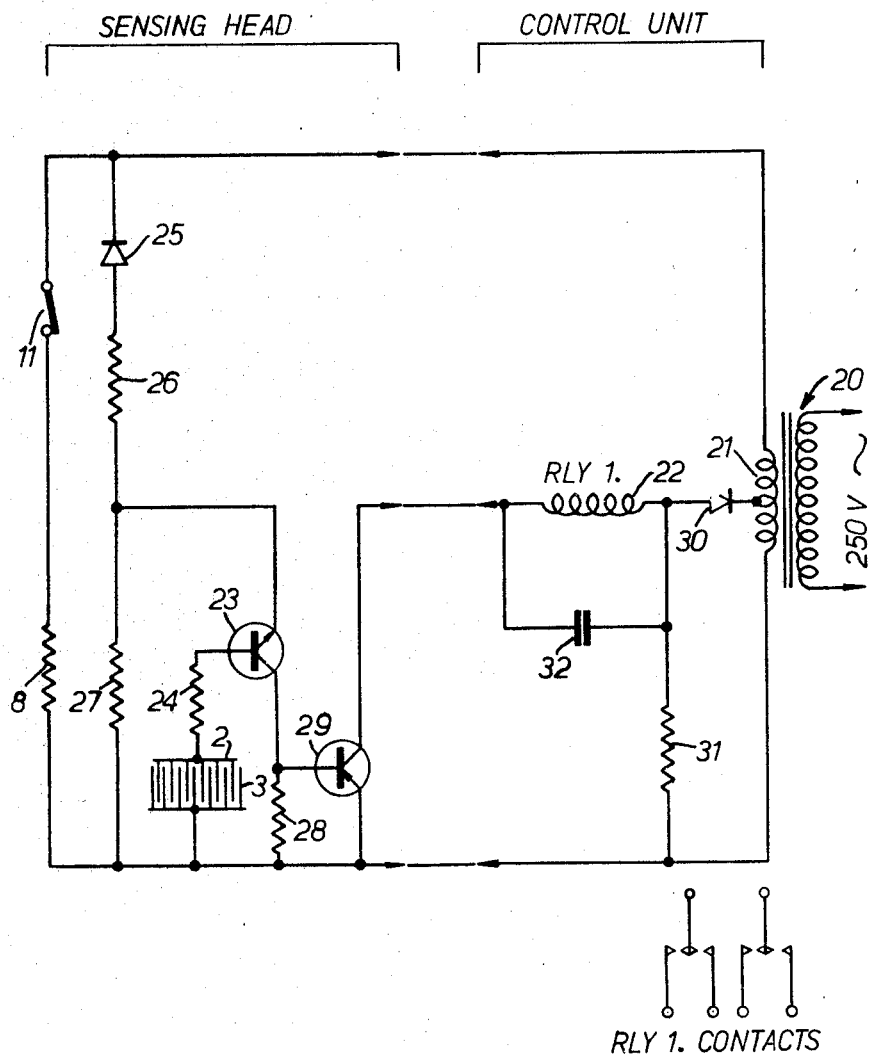

The workings of the equipment 16 and unit 19 are made plain in FIG. 6. The right hand side of that figure represents the unit 19, whereas the left hand side represents the equipment 16 and other items carried by the box 13.

The unit 19 includes a main isolation transformer 20 with a tapped 20 volt secondary winding 21. A power relay 22 controls the opening and closing mechanism of windows, ventilators or the like by means of a solenoid air valve or similar device (not shown). The conducting zones 2 and 3 are in the base and collector circuits respectively of an NPN transistor 23, a resistor 24 being provided to limit the base current in the event of rain saturating the gap between the two zones. A half-wave negative-going voltage derived from rectifier 25 and the associated series and load resistors 26, 27 is applied to the emitter of transistor 23. When the path 4 between zones 2 and 3 offers high resistance (say 500K) no base current flows and transistor 23 does not conduct. When rain "closes" the gap between zones 2 and 3 the resistance 23 starts to conduct and a negative-going half-wave voltage appears across resistor 28. This voltage is applied to the base of transistor 29 which is of PNP type. The collector voltage of this transistor is fed via relay 22 from a negative-going rectified half-wave supply, derived from rectifier 30; resistor 31 provides a small load to improve the wave shape when transistor 29 is not conducting. The output wave forms of rectifiers 25, 30 are in phase. When a voltage appears across resistor 28 current flows in the base circuit of transistor 29 and the transistor conducts, closing relay 22. A capacitor 32 across this relay prevents "chatter" that might be caused by the rectified half-wave supply. The contacts of relay 22 are wired directly into a solenoid valve (not shown) which will control the opening and closing of the windows, ventilators and the like.

By feeding the two transistors 23, 29 with in-phase negative-going rectified half-wave supplies the apparatus avoids the variation in gain associated with D.C. amplifiers exposed to changes in ambient temperature. This is important since the transistors are carried in the box 13 which will be mounted in the open. The apparatus also conveniently avoids the complexity of a typical A.C. amplifier, which is useful also, for instances because an A.C. amplifier would most probably require a non-standard 4-core cable to connect the box 13 to the unit 19. Our apparatus needs only a conventional 3-core cable. It will also be apparent that by feeding the sensing circuit with alternating current, polarisation is avoided when rain gathers on the sensor.

It is convenient to choose resistors such that the maximum current flowing across the gap between zones 2 and 3 is less than 0.005 mA. half-wave A.C. The heating circuit may have a dissipation of about one watt per square inch of the base 1, the area of which may be about 15 sq. ins.

In the system just described, the coming of rain closes the circuit previously opened. The invention could, of course, be applied in apparatus including a sensor where a circuit is normally made and where moisture shorts the circuit. Though it is convenient to assemble the sensor and the electronic items of the operating circuitry in a box that may be sold as a single sensor unit, the sensor could be mounted in a unit by itself, all other active items of the operating circuitry being housed elsewhere.

According to one arrangement of this invention the electric heating circuit comprising coil 8 is in use at all times. Preferably, however, the heating circuit may be brought into use only after rain has fallen, the heating circuit being then preferably switched off upon the sensor becoming dry. Relay 22 may be used to control the heating circuit in the alternative arrangement just referred to.

While the particular rain sensor described with reference to the accompanying drawings has a single sensor more than one sensor may be provided. For example, two sensors may be utilised—one disposed horizontally and the other inclined to the horizontal. The inclined sensor is responsive to rain in the manner previously described. Hail falling on the inclined sensor would be thrown off and cause little, if any, response. However, some of the hail falling upon the horizontal sensor would remain therein and actuate the ventilators or the like. Such a device would therefore be responsive both to rain and hail.

A collector means for rain (e.g., a funnel) may be used to direct rain or hail from a relatively large area on to the relatively small area of the device. In this way the device is rendered more sensitive to small falls of rain or hail.

It may be provided that when the ventilators or the like are closed they remain in the closed position for a predetermined time. This would occur for instance, if the device was actuated by a single drop of rain which is rapidly dried off by the heating circuit.

The panel 1a of aluminium effectively conducts heat from the heating circuit to the sensing circuit. It also serves to suppress currents induced in one such circuit by current flow in the other circuit.

What we claim is:

1. A rain detecting device comprising an electrically-insulating, thermally conductive, plate-like member impervious to moisture having one surface exposed to the atmosphere, a sensing electric circuit on said exposed surface and responsive to rain falling thereon and an electric heater substantially co-extensive with said sensing circuit, and in thermal conductive relationship with the other surface of said plate-like member and heating said plate-like member, and hence said sensing circuit by thermal conduction for substantially uniformly heating said plate-like member.

2. A device according to claim 1 wherein said sensing electric circuit comprises conduction zones having gaps therebetween formed on said plate-like member.

3. A device according to claim 2 wherein said heater comprises a printed circuit heater formed on said other surface of the plate-like member.

4. A device according to claim 2 wherein said plate-like member is inclined to respect to the horizontal direction.

5. A device according to claim 4 wherein said gaps run in a substantially diagonal direction on said inclined plate-like member.

6. A device according to claim 2 wherein said sensing circuit further comprises a substantially temperature insensitive D.C. amplifier, including first and second transistors, the first transistor having its base electrode coupled to said conducting zones and adapted to be operated when moisture bridges a gap between said zones; means for applying a negative-going half-wave voltage to the emitter electrode of said first transistor, the negative-going half-wave voltage being applied to the base of said second transistor when moisture has been sensed; means for applying a second negative-going half-wave voltage to the collector electrode of said second transistor, said half-wave voltages being in phase; and an output utilization device coupled between said collector of said second transistor and said second voltage source.

7. A device according to claim 1 in which a thermostat is provided to control the heat generated by said electric heater.

8. A device as claimed in claim 1 wherein electrical components associated with the heating and sensing circuits are housed in a box-like member and said plate-like member constitutes a removable cover piece to close the box-like member.

9. A device according to claim 8 in which a heat-insulating diaphragm parallel with the plate-like member sub-divides the box-like member into two compartments and a thermostat is in the compartment defined between the diaphragm and the plate-like member and said electrical components are in the other of said two compartments.

10. A device as claimed in claim 1 wherein plate-like member comprises a conductor plate sandwiched between sheets of insulating material, said heater being formed on the outwardly-directed face of one sheet and said sensing circuit being formed on the outwardly-directed face of the other sheet.

References Cited

UNITED STATES PATENTS

| | | | |
|---|---|---|---|
| 2,543,384 | 2/1951 | Squier | 338—35 |
| 2,563,341 | 8/1951 | Kettering | 200—61.05 |
| 2,647,234 | 7/1953 | Pear | 73—336.5 X |
| 2,740,293 | 4/1956 | Brady | 73—336.5 X |
| 2,937,524 | 5/1960 | Gregor | 338—35 X |
| 3,056,935 | 10/1962 | Jensen | 338—35 X |
| 3,077,774 | 2/1963 | McIlugine | 338—35 X |

ROBERT K. SCHAEFER, Primary Examiner

T. B. JOIKE, Assistant Examiner

U.S. Cl. X.R.

200—61.05; 338—35